United States Patent
Winkelmann

(10) Patent No.: US 11,407,495 B2
(45) Date of Patent: Aug. 9, 2022

(54) ACTUATOR ASSEMBLY FOR A HIGH-LIFT DEVICE, WING ASSEMBLY AND AIRCRAFT EQUIPPED WITH SUCH AN ACTUATOR ARRANGEMENT

(71) Applicant: Airbus Operations GmbH, Hamburg (DE)

(72) Inventor: Christoph Winkelmann, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 78 days.

(21) Appl. No.: 17/004,585

(22) Filed: Aug. 27, 2020

(65) Prior Publication Data
US 2021/0061445 A1    Mar. 4, 2021

(51) Int. Cl.
*B64C 13/16* (2006.01)
*B64C 13/28* (2006.01)
*B64C 9/24* (2006.01)

(52) U.S. Cl.
CPC ............ *B64C 13/16* (2013.01); *B64C 9/24* (2013.01); *B64C 13/28* (2013.01)

(58) Field of Classification Search
CPC  B64C 13/16; B64C 13/28; B64C 9/24; G01L 5/00
See application file for complete search history.

(56) References Cited

U.S. PATENT DOCUMENTS

| | | | | |
|---|---|---|---|---|
| 3,891,908 A | * | 6/1975 | Porras | H01H 35/006 318/434 |
| 5,327,790 A | * | 7/1994 | Levin | B25J 9/12 73/862.321 |
| 8,132,763 B2 | * | 3/2012 | Schievelbusch | B64D 45/0005 244/99.3 |
| 8,373,376 B2 | * | 2/2013 | Hauzenberger | B64C 13/24 318/563 |
| 2013/0181089 A1 | * | 7/2013 | Recksiek | B64C 9/02 244/99.3 |
| 2013/0261852 A1 | * | 10/2013 | Recksiek | B64C 13/30 701/3 |
| 2019/0337635 A1 | * | 11/2019 | Ankney | G06K 19/07773 |
| 2020/0183425 A1 | * | 6/2020 | Yamashita | G05D 1/0204 |

FOREIGN PATENT DOCUMENTS

| | | |
|---|---|---|
| DE | 102007030059 A1 | 2/2009 |
| DE | 102010044678 A1 | 3/2012 |
| EP | 1160553 B1 | 12/2001 |
| EP | 2039605 B1 | 3/2009 |

OTHER PUBLICATIONS

German Search Report; priority document.

* cited by examiner

*Primary Examiner* — Tye William Abell
(74) *Attorney, Agent, or Firm* — Greer, Burns & Crain, Ltd.

(57) ABSTRACT

To improve reliability and safety of an actuator assembly for a high-lift device, a torque sensing device is provided on a static structural part, which is used to mount the actuator of the actuator assembly to an aircraft interface, such as a rib or an interconnection strut. A controller determines a reaction torque value based on the output signal of the torque sensing device and monitors and controls the actuator based on the reaction torque value and predetermined load thresholds.

19 Claims, 2 Drawing Sheets

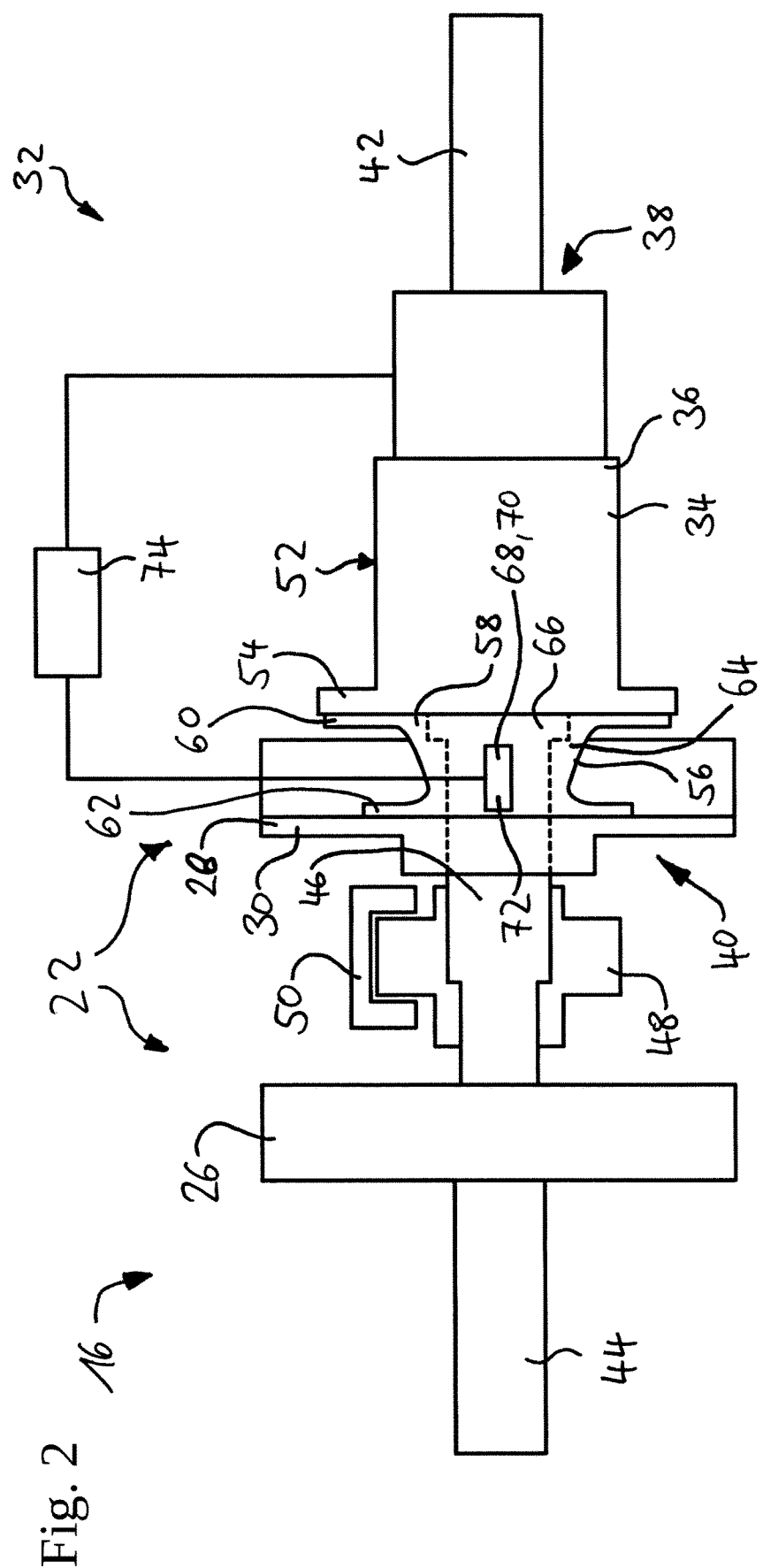

ACTUATOR ASSEMBLY FOR A HIGH-LIFT DEVICE, WING ASSEMBLY AND AIRCRAFT EQUIPPED WITH SUCH AN ACTUATOR ARRANGEMENT

CROSS-REFERENCES TO RELATED APPLICATIONS

This application claims the benefit of the German patent application No. 102019123363.1 filed on Aug. 30, 2019, the entire disclosures of which are incorporated herein by way of reference.

FIELD OF THE INVENTION

The invention relates to an actuator arrangement configured for moving a high-lift device of an aircraft between a fully retracted and a fully extended position. Furthermore, the invention relates to a wing assembly and an aircraft equipped with such an actuator arrangement. Finally, the invention relates to an operating method for an actuator assembly.

BACKGROUND OF THE INVENTION

US 2013/0 181 089 A1 discloses an adjustment system of an airplane. A load sensor records the load occurring in the load path between the actuator and an adjustable flap.

EP 1 160 553 B1 discloses an adaptor with a sensor mounted between a driving motor and a driven transmission.

U.S. Pat. No. 5,327,790 A discloses a reaction torque actuator having a sensor operatively coupled between a motor housing and an outer housing.

U.S. Pat. No. 3,891,908 A discloses a nutative type electrical motor having a torque sensor.

SUMMARY OF THE INVENTION

It is an object of the invention to improve actuator arrangements for high-lift devices.

The invention provides an actuator arrangement configured for moving a high-lift device of an aircraft between a fully retracted and a fully extended position, the actuator arrangement comprising an actuator, preferably a geared rotary actuator for driving the high-lift device, a static structural part which is arranged downstream in a flow of force direction of the actuator, and a torque sensing arrangement that is configured for measuring a reaction torque applied to the static structural part by the actuator, wherein the torque sensing arrangement includes a torque sensing device arranged and configured for generating a torque output signal indicative of the reaction torque applied to the structural part.

Preferably, the structural part is arranged so that the reaction torque is predominantly caused by a drive torque applied by the actuator.

Preferably, the structural part is configured for mechanically coupling the actuator to an aircraft interface.

Preferably, the structural part includes the torque sensing device.

Preferably, the torque sensing device is installed on or attached to the structural part.

Preferably, the structural part is an adaptor element having at least one mounting flange configured for mounting the adaptor element to an actuator and/or an aircraft interface.

Preferably, the torque sensing device is arranged between two respective mounting flanges with respect to an axial direction of the adaptor element.

Preferably, the adaptor element comprises a passage configured for an output shaft of an actuator.

Preferably, the torque sensor device comprises a strain gauge.

Preferably, the actuator arrangement further comprises a control device configured for processing the torque output signal into a reaction torque value and controlling the actuator based on the reaction torque value.

Preferably, the control device is configured to switch off operation of the actuator, if the control device determines that the reaction torque value exceeds a maximum load threshold.

Preferably, the control device is configured to determine that the actuator has a no load situation, if the control device determines that the reaction torque value is below a minimum load threshold during retracting or extending.

Preferably, the control device is configured to determine that the actuator is in a high load situation, if the control device determines that the reaction torque value is above a typical load threshold during retracting or extending.

Preferably, the maximum threshold, the minimum threshold, and/or the typical load threshold include a characteristic depending on the position of the actuator and/or the position of the high-lift device.

The invention provides a wing assembly for an aircraft comprising an edge member, a high-lift device movably attached thereto, an aircraft interface for mounting a static structural part, and a preferred actuator arrangement, wherein the actuator is fixed to the aircraft interface via the structural part and the actuator is arranged to engage the high-lift device, so as to drive the high-lift device between the fully retracted and extended positions.

The invention provides an aircraft comprising a preferred actuator arrangement and/or a preferred wing assembly.

The invention provides an operating method for an actuator arrangement, the method comprising:

a) with a torque sensing device arranged at a static structural part, converting a reaction torque predominantly caused by an actuator into an output signal;

b) with a control device, determining a reaction torque value based on the output signal; and c) with the control device, controlling the actuator based on the reaction torque value.

Preferably, in step c) the control device switches off operation of the actuator, if the control device determines that the reaction torque value exceeds a maximum load threshold.

Preferably, in step c) the control device determines that the actuator has a no load situation, if the control device determines that the reaction torque value is below a minimum load threshold during retracting or extending.

Preferably, in step c) the control device is configured to determine that the actuator is in a high load situation, if the control device determines that the reaction torque value is above a typical load threshold during retracting or extending.

Preferably, the maximum threshold, the minimum threshold, and/or the typical load threshold include a characteristic depending on the position of the actuator and/or the position of the high-lift device.

Subsequently technical effects and advantages of embodiments are explained in more detail. It should be noted that not all embodiments implement all advantages at the same time or with the same intensity.

The basic idea is a torque sensing device installed on a static structural part between the actuator and the aircraft interface. Such a sensor allows determining the output torque of the actuator by measuring its reaction torque applied to the structural element between the actuator and the aircraft interface The ideas presented here are applied for measuring the output load of geared rotary actuators as used for driving the leading edge and/or trailing edge surfaces of high lift systems. Thus, while the description may focus on leading edge members and slats, the ideas presented here are not limited thereto.

The load measurement can be used for failure detection such as disconnection and/or jam monitoring of the actuator and preferably the downstream structure. Furthermore, maintenance activities, health monitoring and preventive or predictive maintenance may be supported or improved.

Commonly, failure monitoring of high lift actuation devices and the high lift support structures is performed by measuring the position of the surface stroke at each actuator station or the distance between reference points of structural elements like the interconnection strut. However, these displacement based principles require that the structure has a somewhat defined compliance that allows a deformation which can be detected by the position sensors. Using the principles set forth herein, the defined compliance requirement may be mitigated or even removed.

Another principle to monitor for failures is to measure directly the output load within an output element like an output shaft of a geared rotary actuator or a drive strut or a ball screw actuator. This usually requires the application of sensors that are moving together with the output element or the application of technologies that allow sensing the load by a static receiver which is observing the load within a moving or rotating part.

Another common device is a mechanical torque limiter which reacts in case of an overload situation at the actuator input by applying a brake. This brake can arrest the transmission shaft system and can stimulate a system shut down. A stopped torque shaft system ensures arresting the actuators and will allow the system to fail in a safe condition. However, torque limiters are prone to critical maintenance requirements in case they are used as safety devices which will drive maintenance cost due to the complexity of this task.

With the ideas presented herein, sensor technology on a structural adaptor element between the geared rotary actuator (GRA) and the aircraft structure is used. For example, strain gauges or other types of torque sensors on the structural elements allow measuring the reaction torque of the actuator in combination with the input torque. The input torque of the actuator is typically very small for normal operating cases and roughly 40 to 60 times smaller compared to the output torque leading to only small and manageable errors of the output torque signal. In case of a failure within or downstream of the actuator a load anomaly like an overload situation or a no load situation can be measured at the load sensor. The anomaly may trigger a system shut down which will prevent a consecutive failure of the structure or system, thereby improving security.

In case of a jam within the actuator the torque sensing device can also be used to detect this failure, which provides in addition the option to delete the mechanical torque limiter at the actuator input.

In case a periodic check is required a simple calibrated torque wrench can be used to load the unit with a predetermined torque and to compare it with a load measurement of the system. Also an automatic check function that is triggered by the slat and flap control computer is possible.

Experiments performed by the applicant have shown good results in terms of accuracy and reliability.

Depending on the monitoring task the logic may compare the measured load level to a threshold that can either be fixed or can be a function or characteristic of the actuator stroke. Furthermore, the threshold can be a function of a load comparison between the stations of one high lift surface or the equivalent surface of the other wing side.

Several monitoring cases are considered here:

Down Drive Disconnect Through Shaft Maintained Monitor: In this case the failed GRA (geared rotary actuator) has a blocked output shaft but the through shaft is still intact. The system would usually continue to drive one station of a high lift surface whereas the failed GRA station would be jammed. As a result, the surface would be twisted and could break if a critical stroke was exceeded. With the present idea, the panel twist causes jam loads which are detectable by the proposed actuator arrangement and will trigger a system shut down once a maximum threshold is exceeded.

Disconnect (free wheel) Monitor: The failed actuator may have a disconnect within the actuator or downstream of the actuator. The failed actuator station would not allow the actuator anymore to drive the high lift surface which may lead to the situation that the intact actuator has to carry the full component load. The intact actuator or downstream structure would hence be faced with a higher fatigue loading and would have to be designed for the higher load. With the actuator arrangement envisaged here, detecting the higher load at the intact actuator or the no load situation at the failed unit is possible. Thus, the associated monitoring logic allows detecting this failure and may trigger a system shut down.

Loads Monitor: The actuation device and the aircraft structure are commonly designed for an upper loads threshold. To ensure that this threshold is not exceeded by a system failure (e.g., misrig with running into end stops) or a jam downstream of the actuator the actuator arrangement can be applied to measure the output torque of the geared rotary actuator. Once a load threshold is reached the system is shut down to ensure that a maximum output torque of the actuator is not exceeded.

It should be noted that lettering of method steps is provided for easier reference and does not imply a sequence.

BRIEF DESCRIPTION OF THE DRAWINGS

Embodiments of the invention are described in more detail with reference to the accompanying schematic drawings.

FIG. 2 depicts an embodiment of an actuator arrangement.

DETAILED DESCRIPTION OF THE PREFERRED EMBODIMENTS

Figure 1:
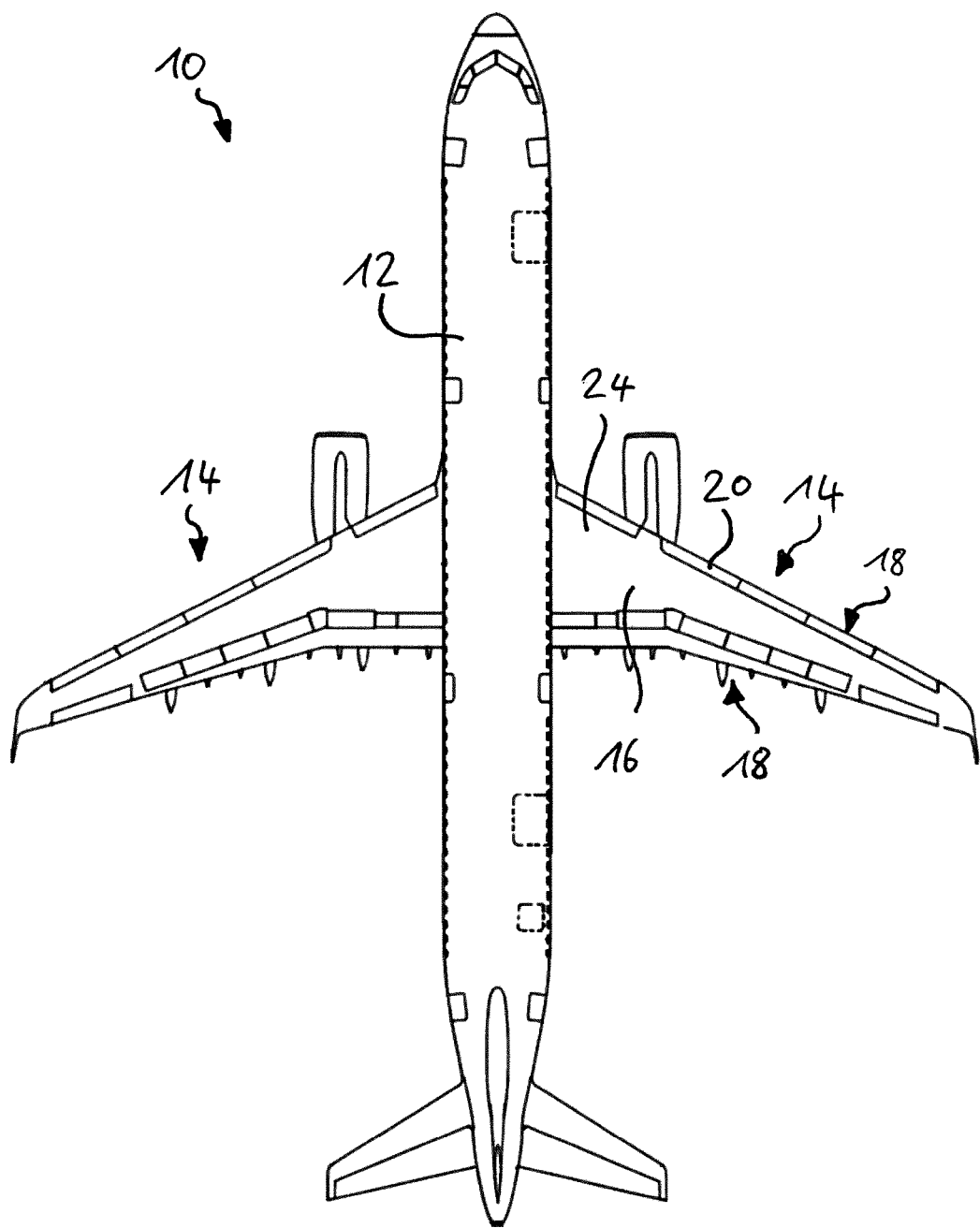
FIG. 1 depicts an embodiment of an aircraft.

FIG. 1 depicts an embodiment of an aircraft 10. The aircraft 10 comprises a fuselage 12 and a pair of wings 14 attached thereto.

The wing 14 comprises a wing assembly 16. The wing assembly 16 includes a high-lift system 18, which may have a plurality of high-lift devices 20, such as slats and flaps.

The wing assembly 16 comprises a frame structure 22, which is covered by an aerodynamic outer skin 24. The frame structure 22 usually includes a plurality of ribs 26 and interconnection struts 28. The rib 26 and the interconnection strut 28 are an example for an aircraft interface 30.

As depicted in more detail in FIG. 2, the wing assembly 16 includes an actuator assembly 32, which is configured to retract and extend the high-lift device 20. The actuator assembly 32 usually comprises a plurality of actuators 34. The actuator 34 may be an electric or hydraulic actuator, such as a geared rotary actuator 36.

The actuator 34 has an input side 38 and an output side 40. A first transmission shaft 42 is mechanically coupled to the input side 38 so as to drive the actuator 34. The first transmission shaft 42 may be mechanically coupled to a power control unit (not shown) or an upstream adjacent output side of an upstream adjacent actuator.

A second transmission shaft 44 is mechanically coupled to the output side 40. The second transmission shaft 44 is connected to a downstream input side of a downstream adjacent actuator (not shown).

Furthermore, an output shaft 46 is mechanically coupled to the output side 40. The output shaft 46 drives a pinion 48, which meshes with a geared track 50. The geared track 50 is attached to the high-lift device 20, so as to retract and extend the high-lift device 20 when the actuator 34 is operated.

The actuator 34 comprises a rigid housing 52. The rigid housing 52 comprises a mounting flange portion 54 for mounting the actuator 34.

The aircraft interface 30 provides a mounting portion for the actuator 34.

However, usually the actuator 34 is not directly mounted to the aircraft interface 30, but rather a static structural part 56 mechanically couples the actuator 34 and the aircraft interface 30.

The static structural part 56 may be configured as an adaptor element 58.

The adaptor element 58 comprises an actuator mounting flange 60 and an aircraft interface mounting flange 62.

The actuator mounting flange 60 is configured to be coupled, preferably bolted, to the actuator 34, preferably to the mounting flange portion 54. The aircraft interface mounting flange 62 is configured to be coupled, preferably bolted, to the aircraft interface 30, such as the rib 26 or the interconnection strut 28.

In an axial direction in between both mounting flanges 60, 62, the adaptor element 58 has an intermediate portion 64. The intermediate portion 64 may be roughly cylindrical in shape or have a thrust-conical shape.

The intermediate portion 64 may thus form a circumferential surface 66 of the adaptor element 58.

The actuator assembly 32 further comprises a torque sensing device 68, which is arranged on the circumferential surface 66, for example. The torque sensing device 68 is not limited to this arrangement. The torque sensing device 68 may also be arranged on any other surface provided by the adaptor element 58 that is suitable. This depends on the type of torque sensing device 68.

For example, the torque sensing device 68 may comprise a strain gauge 70.

Alternatively or in addition, the torque sensing device 68 may comprise a magnetostrictive sensor 72.

In any case, the torque sensing device 68 is configured to convert a reactionary torque applied to the adaptor element 58 by the actuator 34 into an output signal, which is processed by a control device or controller 74.

The control device 74 determines a reaction torque value based on the output signal of the torque sensing device 68. This can be achieved, for example, by applying a predetermined torque to the output side 40 and measuring the output signal of the torque sensing device 68, thereby creating a calibration. It should be noted that the reaction torque value may be measured in arbitrary units.

Subsequently, the function of the actuator assembly 32 is described in more detail.

Initially, the high-lift device 20 is in the retracted position. By sending the appropriate command to the system, the power control unit is activated and turns the first transmission shaft 42 in order to extend the high-lift device. As soon as torque is transferred into the actuator 34, the load incurred by the high-lift device 20 causes a reactionary torque in the adaptor element 58, which is measured using the torque sensing device 68.

The output signal is converted by the control device 74 into a reaction torque value, which is compared with a typical load threshold, which is expected during normal operations. If the control device 74 determines that the reaction torque value is below or within bounds of the typical load threshold, the control device 74 may output a condition signal, which indicates that the system is working fine.

If the control device 74 determines that the reaction torque value exceeds or is out of bounds of the typical load threshold but below a maximum load threshold, the control device 74 may output a condition signal which indicates that the system is still operational but the strain on the monitored actuator 34 is above normal.

If the control device 74 determines that the reaction torque value exceeds a maximum load threshold, the control device 74 may output a condition signal which indicates malfunction of the actuator 34 and trigger a system shutdown in order to avoid structural damage to the high-lift device 20 or other system components.

Thus, the actuator assembly 32 is capable of detecting a failure of a particular actuator 34 or failure of transmission of torque between adjacent actuators.

In order to improve reliability and safety of an actuator assembly 32 for a high-lift device 20, the invention proposes to provide a torque sensing device 68 on a static structural part 56, which is used to mount the actuator 34 of the actuator assembly 32 to an aircraft interface 30, such as a rib 26 or an interconnection strut 28. A control device 74 determines a reaction torque value based on the output signal of the torque sensing device 68 and monitors and controls the actuator 34 based on the reaction torque value and predetermined load thresholds.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage
14 wing 16 wing assembly
18 high-lift system
20 high-lift device
22 frame structure
24 outer skin
26 rib
28 interconnection
30 aircraft interface
32 actuator assembly
34 actuator
36 geared rotary actuator
38 input side
40 output side
42 first transmission shaft
44 second transmission shaft
46 output shaft
48 pinion
50 geared track
52 rigid housing
54 mounting flange portion
56 static structural part
58 adaptor element
60 actuator mounting flange
62 aircraft interface mounting flange
64 intermediate portion
66 circumferential surface
68 torque sensing device
70 strain gauge
72 magnetostrictive sensor
74 control device

The invention claimed is:

1. An actuator arrangement configured for moving a high-lift device of an aircraft between a fully retracted and a fully extended position, the actuator arrangement comprising:
   an actuator for driving the high-lift device,
   a static structural part which is arranged downstream in a flow of force direction of the actuator, and
   a torque sensing arrangement that is configured to measure a reaction torque applied to the static structural part by the actuator, wherein the torque sensing arrangement includes a torque sensing device arranged and configured to generate a torque output signal indicative of the reaction torque applied to the structural part, and
   a control device configured to process the torque output signal into a reaction torque value and controlling the actuator based on the reaction torque value, and determine that the actuator has a no load situation, when the device determines that the reaction torque value is below minimum load threshold during retracting or extending.

2. The actuator arrangement according to claim 1, wherein the structural part is arranged so that the reaction torque is predominantly caused by a drive torque applied by the actuator.

3. The actuator arrangement according to claim 1, wherein the structural part is configured to mechanically couple the actuator to an aircraft interface.

4. The actuator arrangement according to claim 1, wherein the torque sensing device comprises a strain gauge.

5. The actuator arrangement according to claim 1, wherein the control device is configured to determine that the actuator is in a high load situation, if the control device determines that the reaction torque value is above a typical load threshold during retracting or extending.

6. The actuator arrangement according to claim 1, wherein the torque sensing device comprises a magnetostrictive sensor.

7. The actuator arrangement according to claim 1, wherein the structural part includes the torque sensing device.

8. The actuator arrangement according to claim 7, wherein the torque sensing device is installed on or attached to the structural part.

9. The actuator arrangement according to claim 1, wherein the control device is configured to switch off operation of the actuator, if the control device determines that the reaction torque value exceeds a maximum load threshold.

10. The actuator arrangement according to claim 9, wherein at least one of the maximum load threshold, a minimum load threshold, or a typical load threshold include a characteristic depending on at least one of the position of the actuator or the position of the high-lift device.

11. The actuator arrangement according to claim 1, wherein the structural part is an adaptor element having at least one mounting flange configured for mounting the adaptor element to at least one of an actuator or an aircraft interface.

12. The actuator arrangement according to claim 11, wherein the torque sensing device is arranged between two respective mounting flanges with respect to an axial direction of the adaptor element.

13. The actuator arrangement according to claim 11, wherein the adaptor element comprises a passage configured for an output shaft of an actuator.

14. A wing assembly for an aircraft comprising
   an edge member,
   a high-lift device movably attached thereto,
   an aircraft interface for mounting a static structural part, and
   an actuator arrangement according to claim 1,
   wherein the actuator is fixed to the aircraft interface via the structural part and the actuator is arranged to engage the high-lift device, so as to drive the high-lift device between the fully retracted and extended positions.

15. An aircraft comprising an actuator arrangement according to claim 1.

16. An operating method for an actuator arrangement for a high-lift device, the method comprising:
   a) with a torque sensing device arranged at a static structural part, converting a reaction torque predominantly caused by an actuator into an output signal;
   b) with a controller, determining a reaction torque value based on the output signal; and
   c) with the controller, controlling the actuator based on the reaction torque value,
   wherein in step c) the controller determines that the actuator has a no load situation, if the controller determines that the reaction torque value is below a minimum load threshold during retracting or extending.

17. The method according to claim 16, wherein in step c) the controller switches off operation of the actuator, if the controller determines that the reaction torque value exceeds a maximum load threshold.

18. The method according to claim 17,
   wherein the controller is configured to determine that the actuator is in a high load situation, if the controller determines that the reaction torque value is above a typical load threshold during retracting or extending.

19. The method according to claim 18, wherein at least one of the maximum load threshold, the minimum load threshold, or the typical load threshold include a characteristic depending on at least one of a position of the actuator or a position of the high-lift device.

\* \* \* \* \*